US008880001B1

(12) United States Patent
Hwang et al.

(10) Patent No.: US 8,880,001 B1
(45) Date of Patent: Nov. 4, 2014

(54) COLLABORATIVE POSITIONING, NAVIGATION AND TIMING

(75) Inventors: Patrick Y. Hwang, Cedar Rapids, IA (US); Gary A. McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 589 days.

(21) Appl. No.: 13/086,535

(22) Filed: Apr. 14, 2011

(51) Int. Cl.
*H04B 17/00* (2006.01)
*H04M 11/04* (2006.01)
*H04W 4/00* (2009.01)

(52) U.S. Cl.
USPC ............... 455/67.11; 455/404.2; 455/427

(58) Field of Classification Search
USPC ...................................... 455/67.11
See application file for complete search history.

(56) References Cited

U.S. PATENT DOCUMENTS

| | | | | |
|---|---|---|---|---|
| 5,283,811 | A * | 2/1994 | Chennakeshu et al. | 375/233 |
| 6,127,970 | A * | 10/2000 | Lin | 342/357.31 |
| 6,664,923 | B1 * | 12/2003 | Ford | 342/357.59 |
| 2003/0132878 | A1 * | 7/2003 | Devereux et al. | 342/357.06 |
| 2003/0156498 | A1 * | 8/2003 | Weedon et al. | 368/47 |
| 2003/0191604 | A1 * | 10/2003 | Kuwahara et al. | 702/150 |
| 2004/0150557 | A1 * | 8/2004 | Ford et al. | 342/357.14 |
| 2005/0012660 | A1 * | 1/2005 | Nielsen et al. | 342/357.06 |
| 2005/0156782 | A1 * | 7/2005 | Whelan et al. | 342/357.16 |
| 2007/0118286 | A1 * | 5/2007 | Wang et al. | 701/213 |
| 2007/0282528 | A1 * | 12/2007 | Morgan et al. | 701/214 |
| 2007/0282529 | A1 * | 12/2007 | Thompson et al. | 701/220 |
| 2010/0141510 | A1 * | 6/2010 | Dai et al. | 342/357.03 |
| 2010/0188285 | A1 * | 7/2010 | Collins | 342/357.04 |
| 2010/0245172 | A1 * | 9/2010 | Gottifredi et al. | 342/357.51 |
| 2011/0307173 | A1 * | 12/2011 | Riley | 701/220 |
| 2012/0081248 | A1 * | 4/2012 | Kennedy et al. | 342/118 |
| 2012/0098700 | A1 * | 4/2012 | Diggelen | 342/357.28 |
| 2012/0265440 | A1 * | 10/2012 | Morgan | 701/472 |

* cited by examiner

*Primary Examiner* — Temesgh Ghebretinsae
*Assistant Examiner* — Devan Sandiford
(74) *Attorney, Agent, or Firm* — Donna P. Suchy; Daniel M. Barbieri

(57) ABSTRACT

A method for providing collaborative PNT for a plurality of nodes in a distributed sensing system is disclosed. The method may include receiving carrier phase and pseudorange measurements from a first node and a second node of the plurality of nodes; providing a process model for each node, where the process model for each node is configured for modeling error characteristics associated with that node; determining an error covariance between the first node and the second node; and estimating a PNT solution for the first node and a PNT solution for the second node based on: the carrier phase and pseudorange measurements received from the first node, the carrier phase and pseudorange measurements received from the second node, the process model for the first node, the process model for the second node, and the error covariance between the first node and the second node.

20 Claims, 4 Drawing Sheets

COLLABORATIVE POSITIONING, NAVIGATION AND TIMING

TECHNICAL FIELD

The present disclosure relates generally to navigation and positioning systems and more particularly to a method for providing collaborative positioning, navigation and timing (PNT) for a plurality of nodes in a distributed sensing system.

BACKGROUND

A system utilizing distributed sensing may include multiple disparate nodes moving independently with respect to each other. Data collected from such disparate nodes may be processed and coherently combined, which may then be used for various purposes such as navigation, communication, positioning, monitoring or the like. Distributed sensing may be utilized in various fields such as bi-/multi-static synthetic aperture radar imaging, radio frequency (RF) emitter geolocation, distributed RF beam-forming or the like.

An important requirement that enables distributed sensing is the determination of accurate positioning, navigation and timing (PNT) for each node, as well as relative PNT among the nodes. While satellite navigation systems such as the Global Positioning System (GPS) or the like may be utilized to provide PNT information for each node, the accuracy of such PNT information may be limited. These limitations may occur due to various factors, such as the intrinsic accuracy characteristics of the satellite navigation system that is utilized, visibility of the space vehicles from each particular node, signal strength, as well as various other factors.

SUMMARY

The present disclosure is directed to a method for providing collaborative positioning, navigation and timing (PNT) for a plurality of nodes in a distributed sensing system. The method may receive carrier phase and pseudorange measurements from a first node and a second node of the plurality of nodes. The carrier phase and pseudorange measurements may be measured by the first node and the second node based on signals received from a satellite navigation system. The method may also provide a process model for each node. The process model provided for each particular node is configured for modeling error characteristics associated with that node. Furthermore, the method may determine an error covariance between the first node and the second node, and estimate the PNT solution for the first node and the PNT solution for the second node based on: the carrier phase and pseudorange measurements received from the first node, the carrier phase and pseudorange measurements received from the second node, the process model for the first node, the process model for the second node, and the error covariance between the first node and the second node.

A further embodiment of the present disclosure is directed to a distributed sensing system. The distributed sensing system may include a plurality of nodes. Each of the plurality of nodes may be configured for measuring a carrier phase and a pseudorange based on signals received from navigation satellites. The distributed sensing system may further include a collaborative PNT processing module. The collaborative PNT processing module may receive carrier phase and pseudorange measurements from a first node and a second node of the plurality of nodes. The collaborative PNT processing module may also provide a process model for each node. The process model provided for each is configured for modeling error characteristics associated with that node. Furthermore, the collaborative PNT processing module may determine an error covariance between the first node and the second node, and estimate the PNT solution for the first node and the PNT solution for the second node based on: the carrier phase and pseudorange measurements received from the first node, the carrier phase and pseudorange measurements received from the second node, the process model for the first node, the process model for the second node, and the error covariance between the first node and the second node.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Figure 1:
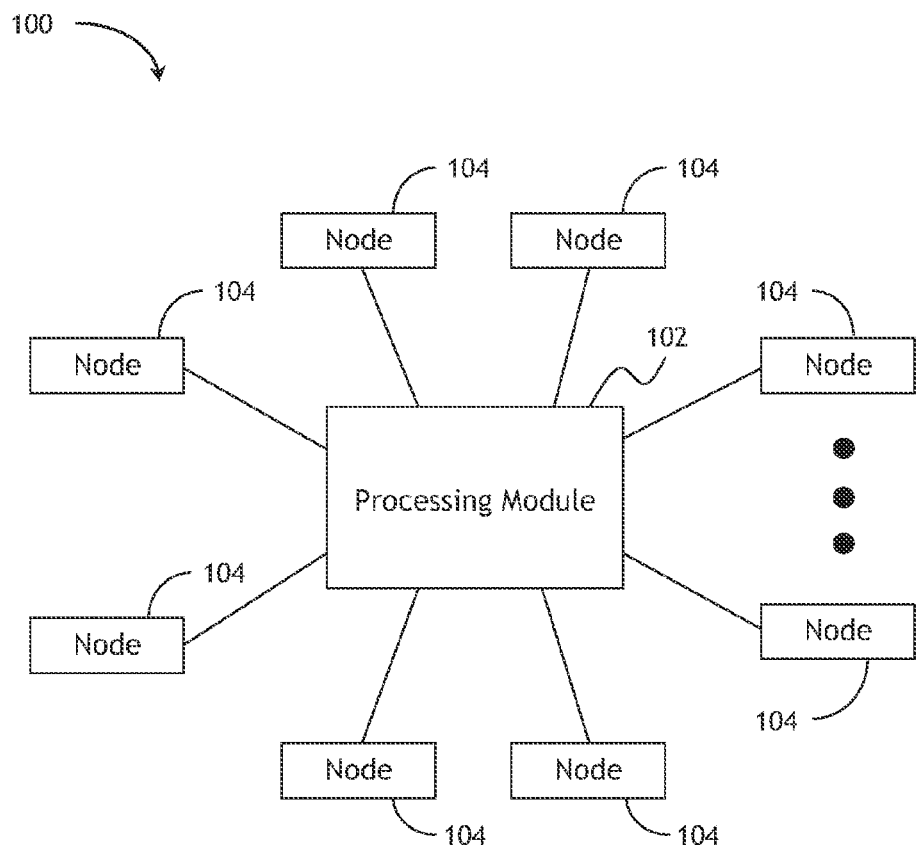
FIG. 1 is a block diagram illustrating a distributed sensing system.

Referring to FIG. 1, a block diagram illustrating a system 100 that utilizes distributed sensing is shown. The system 100 may include a processing module 102 communicatively connected with multiple nodes 104. The processing module 102 may be hosted on any one of the multiple nodes 104. Alternatively, a computing device separate from the multiple nodes 104 may be configured to carry out the functions of the processing module 102.

The positioning, navigation and timing (PNT) solution for each node may be derived from a positioning system. Such positioning systems may include a Global Positioning System (GPS), a Differential GPS (DGPS), a Global Differential GPS (GDGPS), or other types of positioning systems. For example, each node may measure its carrier phase and pseudorange based on signals received from space vehicles (e.g., satellites) of a satellite navigation system. In a conventional method, the PNT solution for each node may be derived based on the carrier phase and pseudorange measurements. However, due to intrinsic accuracy characteristics of the satellite navigation system, visibility and geometry of the satellites, signal strength, as well as various other factors, the accuracy of the PNT solution derived solely based on the carrier phase and pseudorange measurements, for a given situation, may need to be improved to be useful.

Figure 2:
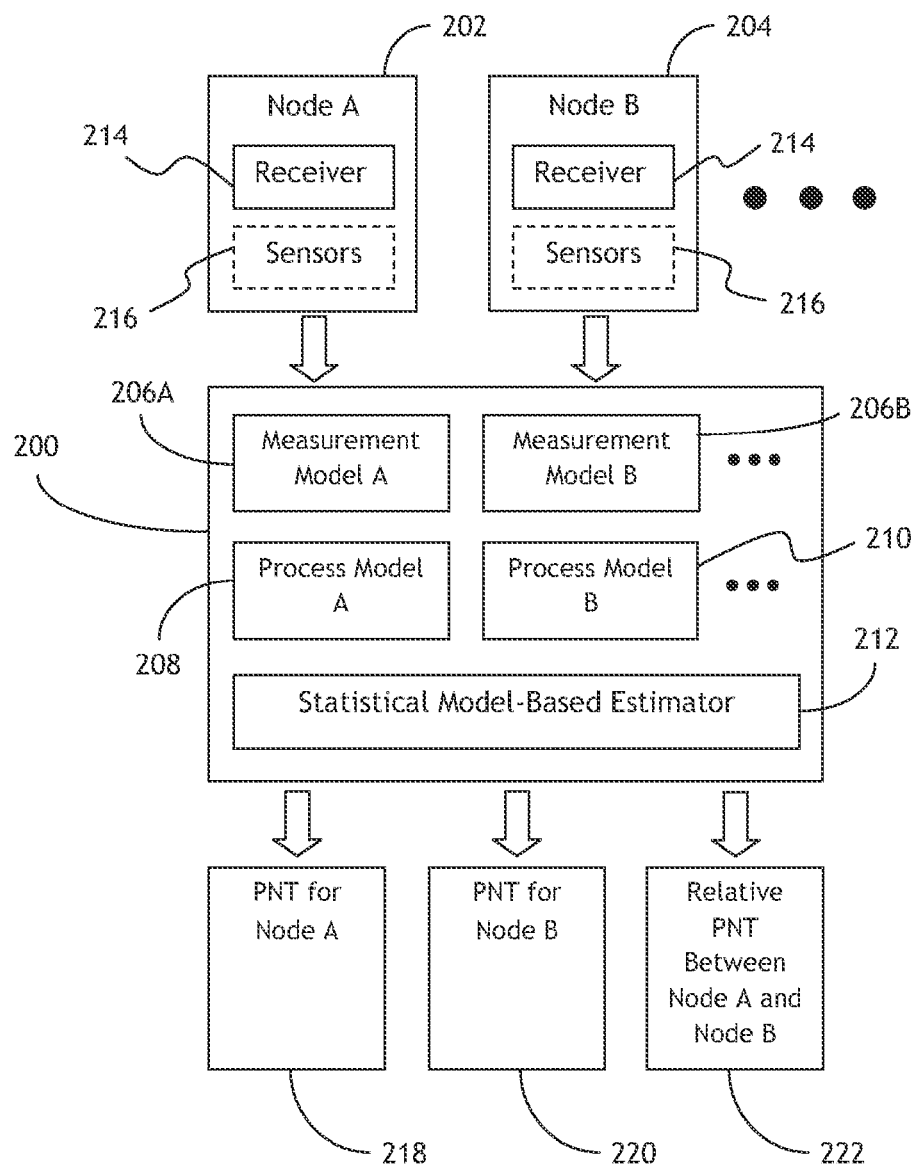
FIG. 2 is a block diagram illustrating a distributed sensing system utilizing collaborative positioning, navigation and timing (PNT) processing.

Referring to FIG. 2, a block diagram illustrating an exemplary collaborative PNT processing module 200 is shown. The collaborative PNT processing module 200 is utilized to improve the accuracy of PNT solution for each node in the distributed sensing system. In accordance with the present disclosure, a statistical model-based estimator (e.g., the extended Kalman filter) is utilized to take into account for probabilities of errors/inaccuracies that may occur both independently within each node and jointly among multiple nodes. Furthermore, the collaborative PNT processing module 200 may also be utilized to provide relative PNT between a given pair of nodes in the distributed sensing system.

The collaborative PNT processing module 200 is communicatively coupled with multiple nodes in the distributed sensing system. The collaborative PNT processing module 200 may communicate with each node via a variety of wired or wireless communication means (e.g., wire or cable, cellular network, wireless data communication, radio frequency (RF), or the like). It is understood that the two nodes depicted in FIG. 2 (node A 202 and node B 204) are merely exemplary for illustrative purposes. The number of nodes that may be supported by the collaborative PNT processing module 200 is not restricted.

Each node in the distributed sensing system may include a receiver 214 configured for receiving signals from one or more navigational satellites. The receiver 214 may process the received signals and measure the carrier phase and pseudorange based on the received signals. It is contemplated that some nodes may further include one or more sensors 216 configured for sensing movements and timing information for accuracy enhancement purposes. For example, a node may include an inertial sensor configured for sensing movements of the node, thereby helping the node to measure its carrier phase and pseudorange based on the signals received from satellites as well as the motion information provided by the inertial sensor (e.g., similar to that of an inertially-aided GPS). It is understood that other types of sensors, such as timing references, motion sensors, rotation sensors, velocity/speed sensors, accelerometers, altimeters or the like may also be utilized without departing from the spirit and scope of the present disclosure.

The carrier phase and pseudorange measured at each node may be communicated to the collaborative PNT processing module 200. In one embodiment, the collaborative PNT processing module 200 may include a measurement model 206 for each particular node in the distributed sensing system. Each measurement model 206 may describe the connection between measurements (e.g., the carrier phase and pseudorange measurements) provided by a particular node and the process state (e.g., clock dynamics and motion dynamics) for that node.

The collaborative PNT processing module 200 further includes multiple independent process models. Each process model independently provides a probabilistic/statistical representation of error dynamics associated with the receiver and the sensor at a particular node. The error dynamics for a particular node may be modeled statistically based on past experiences/behaviors associated with the particular errors at that node. Additionally/alternatively, the probabilistic/statistical representation of error dynamics for a particular node may be actively derived based on the measurement data being collected in real time while the system is in operation. These errors may be due to the receiver or sensors located on that node, or the surrounding environment the node is operating in at the time. It is contemplated that the error dynamics modeled for each node may include, but are not limited to, errors associated with its motion dynamics, errors associated with its clock dynamics, receiver errors such as carrier cycle ambiguities, satellite position errors, atmospheric delays, antenna group delay bias, inertial sensor instrument errors, or the like.

More specifically, for example, different nodes may utilize different types of clocks for time keeping purposes. However, a node utilizing a relatively more stable clock is likely to accrue a lower timing error than another node utilizing a less stable clock, over a period of time. By modeling the clock errors independently for each node in probabilistic terms, the effect of clock errors on the PNT solution may be more accurately accounted for. Similarly, in another example, an inertial sensor used to help determine how the location of a node has changed over time may utilize an error profile that is dependent on the stability of that particular inertial sensor. The process model for this node may therefore include probabilistic descriptions of errors associated with that particular inertial sensor to account for the effect of inertial sensor errors on the PNT solution for this node.

In the example depicted in FIG. 2, process model A 208 is provided for modeling the error characteristics of node A 202 and process model B 210 is provided for modeling the error characteristics of node B 204. By modeling the error characteristics of each node independently, process model A 208, for instance, can more accurately account for the errors associated with receiver 214 and sensors 216 of node A 202 when the measurements are processed to derive the PNT solution for node A 202. Similarly, process model B 210 can more accurately account for the errors associated with the receiver 214 and sensors 216 of node B 204 when the measurements are processed to derive the PNT solution for node B 204.

In addition to taking into account the error characteristics of each node independently, the collaborative PNT processing module 200 further takes into account the joint probabilities of errors that are common or partially correlated among multiple nodes. For example, if two nodes both receive signals from one or more common satellites, they may exhibit certain common measurement errors. Such joint probabilities of errors may be represented accordingly in the covariance in the appropriate error models between a pair of nodes, and this is then accounted for by the statistical model-based estimator 212 of the collaborative PNT processing module 200.

The statistical model-based estimator 212 may be implemented as a Bayesian estimator. More specifically, the statistical model-based estimator 212 in one embodiment is implemented utilizing the extended Kalman filter (a specialized derivative of the Bayesian estimator), which takes into account for error covariance between two nodes. In the example illustrated in FIG. 2, the extended Kalman filter (as the statistical model-based estimator 212) may process the carrier phase and pseudorange measurements observed over time for node A 202 and node B 204 as well as their error characteristics to produce the PNT solution 218 for node A and the PNT solution 220 for node B. That is, the extended Kalman filter may improve the accuracies of the carrier phase and pseudorange measurements for node A 202 and node B 204 by taking into account for probabilities of errors that may occur both independently within each node (provided by their corresponding process models) and jointly as a pair (i.e., the error covariance determined by the extended Kalman filter). Furthermore, the extended Kalman filter may utilize the improved carrier phase and pseudorange measurements to estimate the PNT solution 218 for node A based on the measurement model 206A and estimate the PNT solution 220 for node B based on the measurement model 206B.

It is understood that the processing steps performed by the extended Kalman filter as explained above are provided for illustrative purposes. It may not be necessary for the collaborative PNT processing module 200 to define such steps explicitly. Rather, from the perspective of the collaborative PNT processing module 200, the carrier phase and pseudorange measurements for node A 202 and node B 204 may be provided as the input to the extended Kalman filter (the statistical model-based estimator 212), which may then produce the PNT solution 218 for node A and the PNT solution 220 for node B as the output as described above.

It is contemplated that in addition to producing PNT solution for node A and node B independently (i.e., the absolute PNT information for node A and B), the collaborative PNT processing module 200 may be further configured for calculating a relative PNT 222 between the two nodes. For example, based on the PNT solution for node A 202 and node B 204, the collaborative PNT processing module 200 may calculate the relative PNT of node B 204 with respect to node A 202 or vice versa. Therefore, the collaborative PNT processing in accordance with the present disclosure may produce absolute and relative PNT information in one seamless solution.

As previously mentioned, there may be various other factors that may contribute to PNT inaccuracies. Suppose, for illustrative purposes, that node B has a relatively poor satellite visibility condition compared to node A. In this scenario, the errors associated with the satellite signals received at node B may be greater than the errors associated with the satellite signals received at node A. In addition, greater errors associated with node B may also affect the accuracy of the relative PNT between node A and node B. Therefore, a mechanism such as the Two-Way Time Transfer (TWTT) technique for improving accuracy of the signals received at node B based on the signals received at node A may be utilized.

Figure 3:
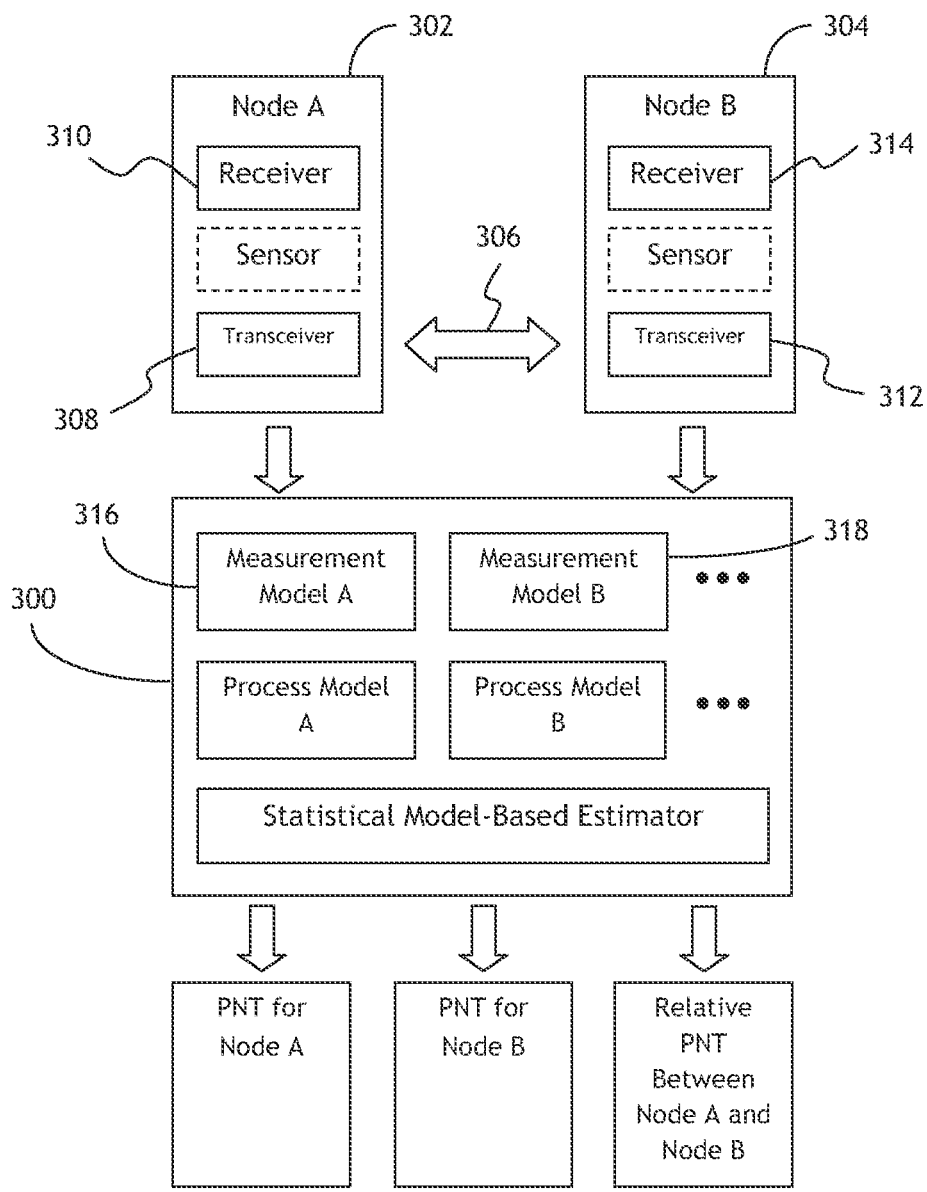
FIG. 3 is a block diagram illustrating a distributed sensing system utilizing collaborative PNT processing and further incorporating two-way time transfer.

Referring to FIG. 3, a block diagram illustrating an exemplary collaborative PNT processing module 300 incorporating the Two-Way Time Transfer (TWTT) technique is shown. The TWTT technique may be utilized to mitigate the impact of PNT errors of node B in the example above. An exemplary Two-Way Time Transfer system is disclosed in: Communication link time transfer to improve navigation system accuracy, U.S. Pat. No. 7,405,694, which is herein incorporated by reference in its entirety. Another exemplary Two-Way Time Transfer system is disclosed in: Communications link time transfer to improve navigation system accuracy, U.S. Pat. No. 7,679,554, which is also herein incorporated by reference in its entirety.

To improve accuracy of the signals received at node B 304 based on the signals received at node A 302, a two-way communications link 306 may be established between the two nodes. The communications link 306 may allow time offsets to be transmitted between node A 302 and node B 304. The communications link 306 may be of any form suitable for two-way time transfer such as a radio communications link, an optical communications link or the like.

In one embodiment, each node may include a transceiver 308 and 312 configured for establishing the communications link 306 between the two nodes. Each transceiver may include a timing reference (e.g., a clock) that keeps track of time independently. For example, transceiver 308 may include a timing reference that keeps track of time independently with respect to the timing information measured by the receiver 310 based on satellite signals. Similarly, transceiver 312 may also include a timing reference that keeps track of time independently with respect to the timing information measured by the receiver 314 based on satellite signals.

In an exemplary implementation, the timing information measured by the receivers may be considered as the master timing references while the timing references provided by the transceivers may be considered as the secondary timing references. Utilizing the communications link 306, node B 304 may calculate: a first time offset between the master timing reference of node B 304 and the secondary timing reference of node B 304; a second time offset between the master timing reference of node B 304 and the master timing reference of node A 302; and a third time offset between the master timing reference of node A 302 and the secondary timing reference of node A 302.

An overall time offset may then be computed based on the first time offset, the second time offset and the third time offset. The overall time offset may represent the offset between the clocks located on node A 302 and node B 304. Furthermore, the relative range between node A 302 and node B 304 may also be measured (e.g., based on the time it takes to communicate between the two nodes). In this manner, the measurement model associated with each node may take into account the TWTT measurements (i.e., the time offset and their relative range) and provide further improvements. For instance, in the current example, since node B has a relatively poor visibility condition compared to node A, the time offset and the relative range between node A and node B may be utilized by the measurement model B 318 to adjust the PNT solution for node B 304, thereby improving the relative navigation accuracy for node B 304.

It is contemplated that utilizing the timing information measured by the receivers as the master timing references is merely exemplary. For instance, if a high accuracy clock is utilized by the transceiver of a particular node, this high accuracy clock may be considered as the master timing reference for this node while the timing information measured by its receiver may be considered as the secondary. Additionally/alternatively, a dedicated timing device may be employed to provide the master timing reference for a given node without depart from the spirit and scope of the present disclosure.

By incorporating the TWTT measurement with the collaborative PNT processing of the present disclosure, the PNT information of node B 304 as well as the overall accuracy of the relative PNT between node A 302 and node B 304 may be improved. In one embodiment, the two-way time transfer between a pair of nodes may be invoked at a predetermined time interval (e.g., every 5 seconds). It is understood that whether to implement the TWTT technique and/or how often such time transfers should be invoked may be determined based on the specific operation conditions of the nodes.

While the examples above depict collaborative PNT processing for two nodes, it is understood that the number of nodes supported by the collaborative PNT processing is not limited. For three nodes or more, the collaborative PNT processing module may provide multiple process models, where each process model independently models the error characteristics for one of the nodes (as previously described). Furthermore, one particular node among the multiple nodes may be designated as the master node, and the extended Kalman filter may take into account for the joint probability of errors between the master node and other nodes. For example, suppose node A is designated as the master node among nodes A, B and C, the extended Kalman filter may be configured to process nodes A and B as a pair and nodes A and C as another pair.

It is contemplated that the designation of the master node may be configured and/or modified by a user. Alternatively, the joint processing module may systematically designate a node as the master node, for example, by selecting the node having the least amount of PNT errors. It is also contemplated that various other approaches may be employed by the collaborative PNT processing module for processing three or more nodes without departing from the spirit and scope of the present disclosure. For example, the collaborative PNT processing module may take a more comprehensive (and more process intensive) approach by computing error covariance from the perspectives of all possible node pairs without designating a master node.

Figure 4:
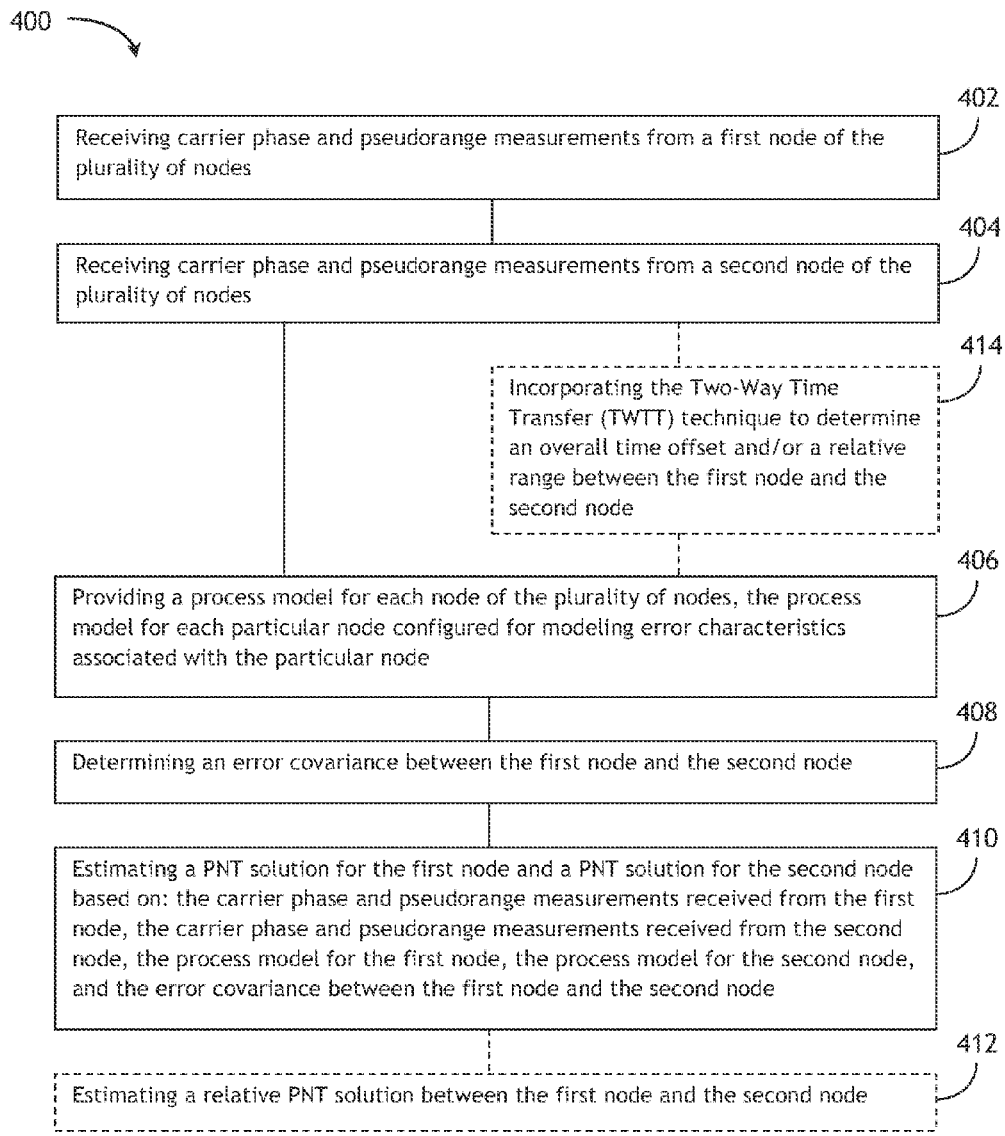
FIG. 4 is a flow chart illustrating a method for providing collaborative PNT for a plurality of nodes in a distributed sensing system.

Referring now to FIG. 4, a method 400 for providing collaborative PNT for a plurality of nodes in accordance with the present disclosure is shown. The method 400 may improve the PNT information derived for each node by taking into account for probabilities of errors/inaccuracies that may occur both independently within each node and jointly among multiple nodes.

Each node in the distributed sensing system may be configured to measure its carrier phase and pseudorange based on signals received from navigation satellites. Some nodes may further include one or more sensors (e.g., inertial sensors or the like) configured to help making the carrier phase and pseudorange measurements. The method 400 may receive the carrier phase and pseudorange measurements from each node in the distributed sensing system. For instance, step 402 may receive the carrier phase and pseudorange measurements from a first node and step 404 may receive the carrier phase and pseudorange measurements from a second node. However, due to various factors such as the intrinsic accuracy characteristics of the sensors, visibility of the space vehicles and the like, the accuracy of the carrier phase and pseudorange measurements provided by each node may need to be improved.

In one embodiment, based on the specific configuration of each node and the behaviors associated with each node observed in the past, a process model may be provided in step 406 to independently model the error characteristics for each node. Furthermore, step 408 may determine the probabilities of errors/inaccuracies that may occur jointly between a pair of nodes to account for any correlation associated with errors between two nodes jointly. For instance, a statistical model-based estimator (e.g., the extended Kalman filter) may be utilized to determine the error covariance between the first node and the second node. By taking into account for probabilities of errors/inaccuracies that may occur both independently within each node and jointly among a pair of nodes, the accuracy of measurements (e.g., carrier phase and pseudorange) received from the first node and the second node may be improved. Step 410 may subsequently estimate the PNT solution for the first node and the PNT solution for the second node jointly based on their corresponding carrier phase and pseudorange measurements as well as probabilities of errors/inaccuracies that may occur both independently within each node and jointly as a pair. The relative PNT solution between the first node and the second node may also be derived in step 412.

It is contemplated that the Two-Way Time Transfer (TWTT) technique may be incorporated with the method of the present disclosure to provide further improvements. For example, step 414 may determine an overall time offset and/or a relative range between the first node and the second node as previously described. In one embodiment, a two-way communications link may be established between the first node and the second node. The two-way communications link enables the first node or the second node to determine a time offset and/or a relative range. The time offset and/or the relative range may be utilized to further improve the relative navigation accuracy for the two nodes as previously described.

It is understood that the present disclosure is not limited to any underlying implementation technology. The present disclosure may be implemented utilizing any combination of software and hardware technology. The present disclosure may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing collaborative positioning, navigation and timing (PNT) for a plurality of nodes, the method comprising:
    receiving carrier phase and pseudorange measurements from a first node of the plurality of nodes, the carrier phase and pseudorange measurements being measured by the first node based on signals received from a satellite navigation system;
    receiving carrier phase and pseudorange measurements from a second node of the plurality of nodes, the carrier phase and pseudorange measurements being measured by the second node based on signals received from the satellite navigation system;
    providing an error characteristics process model for each particular node of the plurality of nodes, the error characteristics process model for each particular node configured for independently modeling error characteristics associated with the particular node, wherein the error characteristics associated with the particular node provides a probability of carrier phase and pseudorange measurement errors occurring at the particular node;
    utilizing a joint statistical error model in an estimation of a PNT solution for the first node and a PNT solution for the second node, the joint statistical error model taking into account: the carrier phase and pseudorange measurements received from the first node, the carrier phase and pseudorange measurements received from the second node, the probability of carrier phase and pseudorange measurement errors occurring at the first node, the probability of carrier phase and pseudorange measurement errors occurring at the second node, and statistical correlation between the first node and the second node.

2. The method of claim 1, wherein the probability of carrier phase and pseudorange measurement errors occurring at the particular node is modeled based on at least one of:
    a probability distribution of error associated with motion dynamics of the node;
    a probability distribution of error associated with clock dynamics of the node; and
    a probability distribution of error associated with a satellite signal as received by a receiver located on the node.

3. The method of claim 1, wherein utilizing a joint statistical error model to estimate a PNT solution for the first node and a PNT solution for the second node further comprises:

utilizing an extended Kalman filter to estimate the PNT solution for the first node and the PNT solution for the second node, the extended Kalman filter taking into account: the carrier phase and pseudorange measurements received from the first node, the carrier phase and pseudorange measurements received from the second node, the probability of carrier phase and pseudorange measurement errors occurring at the first node, the probability of carrier phase and pseudorange measurement errors occurring at the second node, and statistical correlation between the first node and the second node.

4. The method of claim 1, further comprising:
estimating a relative PNT solution between the first node and the second node.

5. The method of claim 1, further comprising:
establishing a two-way communications link between the first node and the second node;
determining at least one of: an overall time offset and a relative range between the first node and the second node; and
adjusting the estimated PNT solution of the first node and the estimated PNT solution of the second node, wherein the adjustment is based on at least one of: the overall time offset and the relative range between the first node and the second node.

6. The method of claim 1, further comprising:
receiving carrier phase and pseudorange measurements from a third node of the plurality of nodes; and
utilizing a joint statistical error model in an estimation of a PNT solution for the third node, the statistical error model taking into account: the carrier phase and pseudorange measurements received from the third node, the probability of carrier phase and pseudorange measurement errors occurring at the third node, and statistical correlation between the first node and the third node.

7. A method for providing collaborative positioning, navigation and timing (PNT) for a plurality of nodes, the method comprising:
receiving carrier phase and pseudorange measurements from a first node of the plurality of nodes, the carrier phase and pseudorange measurements being measured by the first node based on signals received from a satellite navigation system;
receiving carrier phase and pseudorange measurements from a second node of the plurality of nodes, the carrier phase and pseudorange measurements being measured by the second node based on signals received from the satellite navigation system;
providing an error characteristics process model for each node of the plurality of nodes, the error characteristics process model for each particular node configured for independently modeling error characteristics associated with the particular node, wherein the error characteristics associated with the particular node provides a probability of carrier phase and pseudorange measurement errors occurring at the particular node;
determining joint statistical measurement characteristics of the first node and the second node; and
estimating a PNT solution for the first node and a PNT solution for the second node based on: the carrier phase and pseudorange measurements received from the first node, the carrier phase and pseudorange measurements received from the second node, the probability of carrier phase and pseudorange measurement errors occurring at the first node, the probability of carrier phase and pseudorange measurement errors occurring at the second node, and the joint statistical measurement characteristics of the first node and the second node.

8. The method of claim 7, wherein the probability of carrier phase and pseudorange measurement errors occurring at the particular node is modeled based on at least one of:
a probability distribution of error associated with motion dynamics of the node;
a probability distribution of error associated with clock dynamics of the node; and
a probability distribution of error associated with a satellite signal as received by a receiver located on the node.

9. The method of claim 7, wherein the PNT solution for the first node and the PNT solution for the second node are estimated utilizing a statistical model-based estimator.

10. The method of claim 7, wherein the statistical model-based estimator is an extended Kalman filter.

11. The method of claim 7, further comprising:
estimating a relative PNT solution between the first node and the second node.

12. The method of claim 7, further comprising:
establishing a two-way communications link between the first node and the second node;
determining at least one of: an overall time offset and a relative range between the first node and the second node; and
adjusting the estimated PNT solution of the first node and the estimated PNT solution of the second node, wherein the adjustment is based on at least one of: the overall time offset and the relative range between the first node and the second node.

13. The method of claim 7, further comprising:
receiving carrier phase and pseudorange measurements from a third node of the plurality of nodes;
determining joint statistical measurement characteristics of the first node and the third node; and
estimating a PNT solution for the third node based on: the carrier phase and pseudorange measurements received from the third node, the probability of carrier phase and pseudorange measurement errors occurring at the third node, and the joint statistical measurement characteristics of the first node and the third node.

14. A distributed sensing system, comprising:
a plurality of nodes, each of the plurality of nodes configured for measuring a carrier phase and a pseudorange based on signals received from a plurality of navigation satellites; and
a collaborative positioning, navigation and timing (PNT) processing module, the collaborative PNT processing module communicatively coupled with the plurality of nodes, the collaborative PNT processing module configured for:
receiving the carrier phase and the pseudorange from a first node of the plurality of nodes;
receiving the carrier phase and the pseudorange from a second node of the plurality of nodes;
providing an error characteristics process model for each node of the plurality of nodes, the error characteristics process model for each particular node configured for independently modeling error characteristics associated with the particular node, wherein the error characteristics associated with the particular node provides a probability of carrier phase and pseudorange measurement errors occurring at the particular node; and
utilizing a joint statistical error model in an estimation of a PNT solution for the first node and a PNT solution for the second node, the joint statistical error model taking into account: the carrier phase and pseudorange measurements received from the first node, the carrier phase and pseudorange measurements received from the second node, the probability of carrier phase and pseudorange measurement errors occurring at the first node, the probability of carrier phase and pseudorange measurement errors occurring at the second node, and statistical correlation between the first node and the second node.

15. The distributed sensing system of claim 14, wherein each particular node of the plurality of nodes further comprises at least one of: a motion sensor and a timing reference.

16. The distributed sensing system of claim 15, wherein the probability of carrier phase and pseudorange measurement errors occurring at the particular node is modeled based on at least one of:
   a probability distribution of error associated the motion sensor;
   a probability distribution of error associated the timing reference; and
   a probability distribution of error associated with a satellite signal as received by a receiver located on the node.

17. The distributed sensing system of claim 14, wherein utilizing a joint statistical error model to estimate a PNT solution for the first node and a PNT solution for the second node further comprises:
   utilizing an extended Kalman filter to estimate the PNT solution for the first node and the PNT solution for the second node, the extended Kalman filter taking into account: the carrier phase and pseudorange measurements received from the first node, the carrier phase and pseudorange measurements received from the second node, the probability of carrier phase and pseudorange measurement errors occurring at the first node, the probability of carrier phase and pseudorange measurement errors occurring at the second node, and statistical correlation between the first node and the second node.

18. The distributed sensing system of claim 14, wherein the collaborative PNT processing module is further configured for:
   estimating a relative PNT solution between the first node and the second node.

19. The distributed sensing system of claim 14, further comprising:
   a two-way communications link established between the first node and the second node, the two-way communications link enables determination of at least one of: an overall time offset and a relative range between the first node and the second node; and
   the collaborative PNT processing module is further configured for adjusting the estimated PNT solution of the first node and the estimated PNT solution of the second node, wherein the adjustment is based on at least one of: the overall time offset and the relative range between the first node and the second node.

20. The distributed sensing system of claim 14, wherein the collaborative PNT processing module is further configured for:
   receiving the carrier phase and the pseudorange from a third node of the plurality of nodes; and
   utilizing the joint statistical error model in an estimation of a PNT solution for the third node, the statistical error model taking into account: the carrier phase and pseudorange measurements received from the third node, the probability of carrier phase and pseudorange measurement errors occurring at the third node, and statistical correlation between the first node and the third node.

* * * * *